(12) United States Patent
Lu et al.

(10) Patent No.: US 10,455,506 B2
(45) Date of Patent: Oct. 22, 2019

(54) METHOD AND APPARATUS FOR DISCONTINUOUS RECEPTION

(71) Applicant: Telefonaktiebolaget LM Ericsson (publ), Stockholm (SE)

(72) Inventors: Qianxi Lu, Beijing (CN); Rui Fan, Beijing (CN); Xinghua Song, Beijing (CN); Mattias Tan Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 82 days.

(21) Appl. No.: 15/573,161

(22) PCT Filed: May 11, 2015

(86) PCT No.: PCT/CN2015/078699
§ 371 (c)(1),
(2) Date: Nov. 10, 2017

(87) PCT Pub. No.: WO2016/179783
PCT Pub. Date: Nov. 17, 2016

(65) Prior Publication Data
US 2018/0110004 A1    Apr. 19, 2018

(51) Int. Cl.
*H04W 52/02* (2009.01)
*H04W 76/15* (2018.01)
(Continued)

(52) U.S. Cl.
CPC ....... *H04W 52/0216* (2013.01); *H04W 76/15* (2018.02); *H04W 76/28* (2018.02);
(Continued)

(58) Field of Classification Search
CPC .............................................. H04W 52/0216
(Continued)

(56) References Cited

FOREIGN PATENT DOCUMENTS

| CN | 104581908 A | 4/2015 |
| WO | 2014 088295 A1 | 6/2014 |

(Continued)

OTHER PUBLICATIONS

Extended European Search Report for Application No./Patent No. 15891486.1 / 1231 / 3295746 PCT/CN2015078699—dated Mar. 20, 2018.

(Continued)

*Primary Examiner* — Shripal K Khajuria
(74) *Attorney, Agent, or Firm* — Sage Patent Group

(57) ABSTRACT

Embodiments of the present disclosure provide an efficient discontinuous reception solution applicable in a Licensed-Assisted Access scenario. Particularly, there is provided a method for discontinuous reception at a terminal device that is operable in both a licensed spectrum and an unlicensed spectrum. The method comprises receiving a subframe on an unlicensed carrier of the unlicensed spectrum during running of a first predetermined timer for which the terminal device is active and then determining whether the subframe is received from a base station that is operable in both the licensed spectrum and the unlicensed spectrum. Further, the method may also comprise extending the first predetermined timer in response to determining that the subframe is not received from the base station and during running of the extended first predetermined timer, keeping receiving a subframe on the unlicensed carrier of the unlicensed spectrum and determining whether the subframe is received from the base station. The extended first predetermined timer may be stopped in response to that a subframe is received from the base station. Correspondingly, there is also provided an apparatus for discontinuous reception of a terminal device operable in both a licensed spectrum and an unlicensed spectrum.

18 Claims, 10 Drawing Sheets

(51) Int. Cl.
*H04W 76/28* (2018.01)
*H04W 76/38* (2018.01)
*H04W 16/14* (2009.01)
*H04L 5/00* (2006.01)

(52) U.S. Cl.
CPC ............ *H04W 76/38* (2018.02); *H04L 5/001* (2013.01); *H04L 5/0091* (2013.01); *H04W 16/14* (2013.01); *Y02D 70/1262* (2018.01); *Y02D 70/142* (2018.01); *Y02D 70/24* (2018.01)

(58) Field of Classification Search
USPC .......................................................... 370/311
See application file for complete search history.

(56) References Cited

FOREIGN PATENT DOCUMENTS

| | | |
|---|---|---|
| WO | 2014 172306 A2 | 10/2014 |
| WO | 2015 065030 A1 | 5/2015 |
| WO | 2016 160292 A8 | 10/2016 |
| WO | 2016 164202 A1 | 10/2016 |

OTHER PUBLICATIONS

3GPP TSG-RAN WG2 #89; Athens, Greece; Source: Coolpad; Title: Discussion on high layer impacts of LAA (R2-150174)—Feb. 9-13, 2015.

3GPP TSG RAN WG2 Meeting #89bis; Bratislava, Slovakia; Source: Panasonic; Title: DRX operation for LAA (R2-151161)—Apr. 20-24, 2015.

3GPP TSG-RAN WG2 Meeting #89bis; Bratislava, Slovakia; Source: Nokia Networks; Title: LAA impact on DRX (R2-151370)—Apr. 20-24, 2015.

3GPP TSG-RAN WG2 Meeting #89bis; Bratislava, Slovakia; Source: BlackBerry UK Limited; Title: Scheduling and DRX aspects of LAA (R2-151523)—Apr. 20-24, 2015.

EPO Communication Pursuant to Article 94(3) EPC issued for Application No. 15 891 486.1-1231—dated Feb. 11, 2019.

3GPP TSG RAN WG1 Meeting #80bis; Belgrade, Serbia; Title: LS to RAN1: considerations of introducing licensed-assisted access to unlicensed spectrum and importance of licensed spectrum; Source: TSG RAN WG4 (Huawei, Ericsson); To: TSG-RAN WG1 (R1-151237)—Apr. 20-24, 2015.

PCT Notification of Transmittal of the International Search Report and the Written Opinion of the International Searching Authority, or the Declaration for International application No. PCT/CN2015/078699—dated Jan. 26, 2016.

3GPP TR 36.889 v0.1.0; Technical Report; 3rd Generation Partnership Project; Technical Specification Group Radio Access Network; Study on Licensed-Assisted Access to Unlicensed Spectrum; (Release 13)—Nov. 2014.

METHOD AND APPARATUS FOR DISCONTINUOUS RECEPTION

PRIORITY

This nonprovisional application is a U.S. National Stage Filing under 35 U.S.C. § 371 of International Patent Application Serial No. PCT/CN2015/078699 filed May 11, 2015, and entitled "Method And Apparatus For Discontinuous Reception."

TECHNICAL FIELD

The non-limiting and exemplary embodiments of the present disclosure generally relate to wireless communications, and specifically to a method and an apparatus for discontinuous reception of a terminal device operable in both a licensed spectrum and an unlicensed spectrum.

BACKGROUND

This section introduces aspects that may facilitate better understanding of the present disclosure. Accordingly, the statements of this section are to be read in this light and are not to be understood as admissions about what is in the prior art or what is not in the prior art.

The fast uptake of the Third Generation Partnership Project (3GPP)-Long Term Evolution (LTE) in different regions of the world shows both that demand for wireless broadband data is increasing, and that LTE is a successful platform to meet that demand. The existing and new spectrum licensed for exclusive use by International Mobile Telecommunications (IMT) technologies will remain fundamental for providing seamless coverage, achieving the higher spectral efficiency, and ensuring the higher reliability of cellular networks through careful planning and deployment of high-quality network equipment and devices.

In order to meet the ever increasing data traffic demand from users, particularly in concentrated high traffic buildings or hot spots, more mobile broadband bandwidth will be needed. Given a large amount of spectrum available in unlicensed bands around the globe, the unlicensed spectrum is more and more considered by cellular operators as complementary means to augment their service offering. While the unlicensed spectrum may not match the qualities of the licensed regime, solutions that allow an efficient use of it as a complement to licensed deployments have a potential to bring a great value to 3GPP operators, and ultimately to the 3GPP industry as a whole. This type of solutions would enable operators and vendors to leverage the existing or planned investments in LTE/Evolved Package Core (EPC) hardware in radio and core networks.

Licensed-Assisted Access

It has been agreed to study Licensed-Assisted Access (LAA) technologies in the 3GPP at RP-141664. This LAA framework builds on carrier aggregation solutions introduced in LTE Release-10 to access the additional bandwidth in the unlicensed spectrum. FIG. 1 shows an illustrative LTE network that configures a user equipment, UE, to aggregate additional secondary cells (SCells) which are using frequency carriers in the unlicensed spectrum. The primary cell (PCell) maintains exchange of essential control messages and also offers an always-available robust spectrum, i.e. the licensed spectrum, for real-time and high-value traffic. Via the high-quality and robust licensed spectrum, the PCell may also provide mobility handling and management for the UE. The aggregated SCells in the unlicensed spectrum, when available, can be utilized as a bandwidth booster to serve, e.g. the best effort traffic. The LAA SCells may operate in a downlink (DL)-only mode or operate with both uplink (UL) and DL traffic.

DRX Scheme in LTE

The 3GPP specifications for LTE, e.g. 3GPP TS 36.321 v11.5.0, specify a procedure for discontinuous reception (DRX). A UE may be configured by RRC with a DRX functionality that controls the UE's Physical Downlink Control CHannel (PDCCH) monitoring activity. When in RRC_CONNECTED, if DRX is configured, the UE is allowed to monitor the PDCCH discontinuously using the DRX operation as specified in the specification; otherwise the UE monitors the PDCCH continuously. RRC controls DRX operation by configuring the timers, such as onDurationTimer, drx-InactivityTimer, drx-RetransmissionTimer, and the longDRX-Cycle, and optionally the drxShortCycleTimer and shortDRX-Cycle etc. The onDurationTimer specifies the number of consecutive PDCCH-subframe(s) at the beginning of a DRX Cycle. The drx-InactivityTimer specifies the number of consecutive PDCCH-subframe(s) after the subframe in which a PDCCH indicates an initial Uplink (UL) or Downlink (DL) user data transmission for this UE. The drx-RetransmissionTimer specifies the maximum number of consecutive PDCCH-subframe(s) until a DL retransmission is received. The DRX Cycle specifies the periodic repetition of the On Duration followed by a possible period of inactivity, comprising the long DRX-Cycle and the shortDRC-Cycle. The drxShortCycleTimer specifies the number of consecutive subframe(s) the UE shall follow the short DRX cycle.

FIG. 2 shows a basic DRX procedure in LTE. As illustrated, the blocks with oblique lines represent the active time defined by the onDurationTimer or the drx-InactivityTimer, while the blank blocks represent the time that no transmission occurs. During the first two longDRX-Cycles, no DL/UL grant is received in the active time defined by the onDurationTimer. During the third longDRX-Cycle, a DL/UL grant is received in the active time defined by the onDurationTimer, which is represented with a dotted block in FIG. 2, and then the drx-InactivityTimer is started. During the active time defined by the drx-InacitivityTimer, the UE can conduct continuous transmission. If the drx-Inactivity-Timer expires or a DRX Command MAC control element is received, the drxShortCycleTimer starts and the short DRX cycle will be used.

Powering Saving Scheme in 802.11

IEEE-802.11 was designed with power saving in mind for terminal stations. To assist terminal stations with power saving, Access Points (APs) are designed to buffer frames for a terminal station when that terminal station is in power save mode and to transmit them later to the terminal station when the AP knows the terminal station will listen. When a terminal station is in power save mode, it turns off its transmitter and receiver to preserve energy. It takes less power for a terminal station to turn its receiver on to listen to frames than to turn its transmitter on to transmit frames. For this reason, it's more power-efficient for an AP to inform a terminal station if it has buffered frames present on the AP than to have the terminal station poll the AP querying if frames are present.

Target Beacon Transmission Time (TBTT) is the time at which a node (AP or terminal station when in Ad-hoc) must send a beacon. The time difference between two TBTTs is known as the beacon interval. The beacon interval is given in Time Units (TU), each TU represents 1024 microseconds.

The beacon interval is typically set to 100 TUs (102400 microseconds, or 102.4 ms) and its length is two bytes.

During association, a "Listen Interval" field is provided by the terminal station. The listen interval is given in beacon interval units, so essentially it tells the AP how many beacons it wants to ignore before turning the receiver on. Two bytes are used to represent the listen interval. Depending on how the AP is tuned, usually based on the amount of space desired for buffered frames, the association may or may not be rejected. After the listen interval, the AP does not guarantee it will buffer frames for the terminal station anymore and may discard them. As might be expected then, the listen interval can be used by the AP as a guaranteed maximum time before terminal stations listen to one of their beacons.

The IEEE-802.11 standards chose to use a bitmap to indicate to any sleeping listening terminal stations if the AP has any buffered frames present for it. Because terminal stations should listen to at least one beacon before the listen interval, the AP periodically sends this bitmap on its beacons as an information element. The bit mask is called the Traffic Indication Map and consists of 2008 bits, each bit representing the Association Id (AID) of a terminal station.

After a terminal station receives a Traffic Indication Map (TIM) and if it sees that the AP has buffered frames for it, it must send a Power Save Poll (PS-Poll) control frame to retrieve each buffered frame on the AP. The terminal station may go back to sleep after the PS-Poll frame exchange or once the TIM no longer has its AID present.

In an 802.11 Wireless Local Area Network (WLAN) system, beacon transmission also follows the Carrier Sense Multiple Access with Collision Detection (CSMA/CA) scheme, which is also called Listen Before Talk (LBT). LBT is a technique used in radio communications whereby a radio transmitters first senses its radio environment before it starts a transmission. LBT can be used by a radio device to find a network the device is allowed to operate on or to find a free radio channel to operate on.

However, direct application of the existing DRX scheme in LTE or power saving scheme in 802.11 to LAA networks may cause some problems due to involvement of both licensed carriers and unlicensed carriers into cellular transmission.

SUMMARY

Various embodiments of the present disclosure mainly aim at providing an efficient DRX scheme in consideration of uncertainty of resource availability on unlicensed carriers in the LAA scenario. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method for discontinuous reception at a terminal device operable in both a licensed spectrum and an unlicensed spectrum. The method comprises receiving a subframe on an unlicensed carrier of the unlicensed spectrum during running of a first predetermined timer. The terminal device is active for the running duration of the first predetermined timer. The method also comprises determining whether the subframe is received from a base station. The base station is operable in both the licensed spectrum and the unlicensed spectrum.

By determining whether the subframe is received from the base station, the terminal device may clearly differentiate between the case that the base station fails to get resources and the case that the base station did not send a resource grant while having obtained the resources.

In an embodiment, the method may further comprise extending the first predetermined timer in response to determining that the subframe is not received from the base station. The method may then comprise keeping receiving a subframe on the unlicensed carrier of the unlicensed spectrum and determining whether the subframe is received from the base station during running of the extended first predetermined timer. The extended first predetermined timer may be stopped in response that a subframe is received from the base station.

In another embodiment, the first predetermined timer may be extended by starting a second predetermined timer and suspending the first predetermined timer in response to determining that the subframe is not received from the base station. The first predetermined timer may be resumed upon the second predetermined timer expires.

According to the above two embodiments, even though the predetermined active period is going to expire, the terminal device may still have more time to wait for successful transmission from the base station. This waiting time can be configured, for example according to implementation requirements or the power condition of the terminal device. Therefore, compared to the existing DRX scheme in LTE or the power saving scheme in 802.11, the discontinuous reception solution according to the embodiments of the present disclosure provides an option to trade-off between the waiting time and the power consumption.

In yet another embodiment, the method may further comprise suspending the first predetermined timer in response to determining that the subframe is not received from the base station. The method may then comprise keeping receiving a subframe on the unlicensed carrier of the unlicensed spectrum and determining whether the subframe is received from the base station during the suspending of the first predetermined timer. The first predetermined timer may be resumed in response to reception of a message on another carrier that causes resuming of the first predetermined timer.

According to this embodiment, the base station can dynamically and actively control the time taken by the terminal device to wait for successful transmission from the base station on the unlicensed carrier, for example according to the overall scheduling situation on all schedulable carriers, so that the waiting time may be properly extended taking into account the power consumption of the terminal device.

In a further embodiment, the message may comprise any of the following: downlink control information containing a resource grant to a specific terminal device; downlink control information indicating end of an active period on a specific unlicensed carrier; a media access control element indicating end of an active period on a specific unlicensed carrier; or radio resource signaling for reconfiguring configurations of the discontinuous reception on the unlicensed carrier.

In another embodiment, whether the subframe is received from the base station may be determined based on a reference signal comprised in a received subframe.

In a second aspect of the present disclosure, there is provided a method for facilitating discontinuous reception of a terminal device. The method is performed at a base station. The base station and the terminal device are operable in both a licensed spectrum and an unlicensed spectrum. The method comprises configuring a timer for the terminal device. The terminal device is active during running of the timer. The method further comprises sending a message to the terminal device. The message causes resuming of the timer that is suspended in response that no subframe is received at the terminal device from the base station on an unlicensed carrier of the unlicensed spectrum. The message is sent on a carrier that a licensed carrier of the licensed spectrum or another unlicensed carrier of the unlicensed spectrum.

According to this embodiment, the base station can dynamically and actively control the time taken by the terminal device to wait for successful transmission from the base station on the unlicensed carrier, for example according to the overall scheduling situation on all schedulable carriers.

In an embodiment, the message may comprise any of the following: downlink control information containing a resource grant to a specific terminal device; downlink control information indicating end of an active period on a specific unlicensed carrier; a media access control element indicating end of an active period on a specific unlicensed carrier; or radio resource signaling for reconfiguring configurations of the discontinuous reception on the unlicensed carrier.

In a third aspect of the present disclosure, there is provided a method for facilitating discontinuous reception of a terminal device. The method is performed at a base station. The base station and the terminal device are operable in both a licensed spectrum and an unlicensed spectrum. The method comprises determining a remaining time period in an active period. The terminal device keeps active in the active period. If the remaining time period is greater than a predetermined threshold, transmission to the terminal device is scheduled on both a licensed carrier of the licensed spectrum and an unlicensed carrier of the unlicensed spectrum; otherwise, transmission to the terminal device is scheduled on the licensed carrier.

This method may keep using a single DRX thread in the LAA scenario, thereby maintaining a good compatibility with the existing networks. By means of this method, in the case that the active period set for the terminal device is going to expires, it is still ensured that the terminal device may have an opportunity to obtain the expected transmission on the licensed carrier.

In a fourth aspect of the present disclosure, there is provided an apparatus for discontinuous reception at a terminal device operable in both a licensed spectrum and an unlicensed spectrum. The apparatus comprises a receiving unit and a determining unit. The receiving unit is configured to receive a subframe on an unlicensed carrier of the unlicensed spectrum during running of a first predetermined timer. The terminal device is active for the running duration of the first predetermined timer. The determining unit is configured to determine whether the subframe is received from a base station that is operable in both the licensed spectrum and the unlicensed spectrum.

In an embodiment, the apparatus may further comprise a first timer controlling unit. The first timer controlling unit may be configured to extend the first predetermined timer in response to determining by the determining unit that the subframe is not received from the base station. In this embodiment, the receiving unit may be further configured to keep receiving a subframe on the unlicensed carrier of the unlicensed spectrum during running of the extended predetermined timer. The determining unit may be further configured to determine whether the subframe is received from the base station during running of the extended predetermined timer. The first timer controlling unit may be further configured to stop the extended first predetermined timer in response that a subframe is received from the base station.

In another embodiment, the apparatus may further comprise a second timer controlling unit. The second timer controlling unit may be configured to suspend the first predetermined timer in response to determining by the determining unit that the subframe is not received from the base station. In this embodiment, the receiving unit may be further configured to receive a subframe on the unlicensed carrier of the unlicensed spectrum during the suspending of the first predetermined timer. The determining unit may be further configured to determine whether the subframe is received from the base station during the suspending of the first predetermined timer. The second timer controlling unit may be further configured to resume the first predetermined timer in response to reception of a message on another carrier that causes resuming of the first predetermined timer or in response that a subframe is received from the base station.

In a fifth aspect of the present disclosure, there is provided an apparatus for facilitating discontinuous reception of a terminal device. The apparatus may be embodied as a base station or a part thereof. The base station and the terminal device are operable in both a licensed spectrum and an unlicensed spectrum. The apparatus comprises a timer configuring unit and a sending unit. The timer configuring unit is configured to configure a timer for the terminal device, the terminal device being active during running of the timer. The sending unit is configured to send a message to the terminal device that causes resuming of the timer that is suspended in response that no subframe is received at the terminal device from the base station on an unlicensed carrier of the unlicensed spectrum. The message is sent on a carrier that is a licensed carrier of the licensed spectrum or another unlicensed carrier of the unlicensed spectrum.

In a sixth aspect of the present disclosure, there is provided an apparatus for facilitating discontinuous reception of a terminal device. The apparatus is embodied as a base station or a part thereof. The base station and the terminal device are operable in both a licensed spectrum and an unlicensed spectrum. The apparatus comprises a determining unit and a scheduling unit. The determining unit is configured to determine a remaining time period in an active period, the terminal device keeping active in the active period. The scheduling unit is configured to schedule transmission to the terminal device on both a licensed carrier of the licensed spectrum and an unlicensed carrier of the unlicensed spectrum, if the remaining time period is greater than a predetermined threshold; otherwise to schedule transmission to the terminal device on the licensed carrier.

In a seventh aspect of the present disclosure, there is provided an apparatus for discontinuous reception at a terminal device operable in both a licensed spectrum and an unlicensed spectrum. The apparatus comprises a processor and a memory. The memory contains instructions executable by the processor, whereby the apparatus is operative to perform the method of the first aspect of the present disclosure.

In an eighth aspect of the present disclosure, there is provided an apparatus for discontinuous reception at a terminal device operable in both a licensed spectrum and an unlicensed spectrum. The apparatus comprises processing means adapted to perform the method according to the first aspect of the present disclosure.

In a ninth aspect of the present disclosure, there is provided an apparatus for facilitating discontinuous reception of a terminal device operable in both a licensed spectrum and an unlicensed spectrum. The apparatus comprises a processor and a memory. The memory contains instructions executable by the processor, whereby the apparatus is operative to perform the method of the second or third aspect of the present disclosure.

In a tenth aspect of the present disclosure, there is provided an apparatus for facilitating discontinuous reception of a terminal device operable in both a licensed spectrum and an unlicensed spectrum. The apparatus comprises processing means adapted to perform the method according to the second or third aspect of the present disclosure.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which.

Like reference numbers and designations in the various drawings indicate like elements.

DETAILED DESCRIPTION

Figure 1:
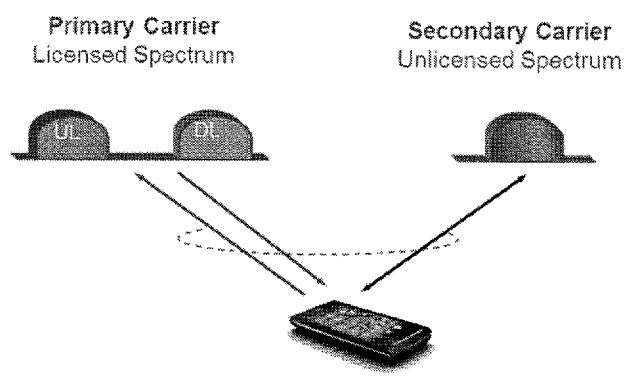
FIG. 1 shows an illustrative LTE network that can configure a UE to aggregate additional secondary cells which are using frequency carriers in the unlicensed spectrum.
Figure 2:
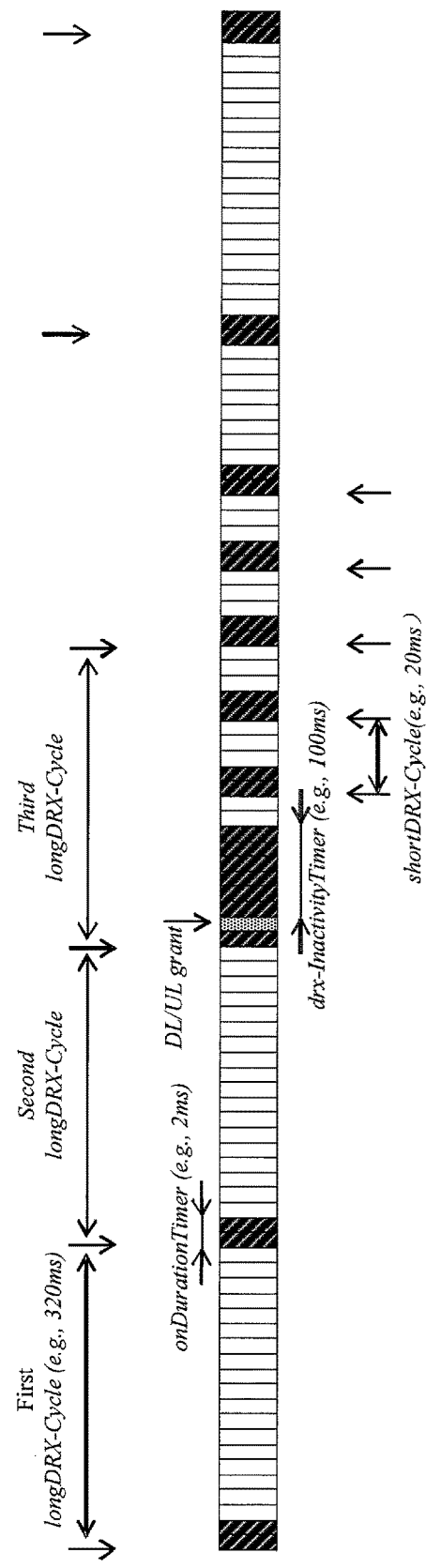
FIG. 2 shows a basic DRX procedure in LTE.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station" (BS), used herein may also be referred to as e.g. eNB, eNodeB, NodeB or base transceiver station (BTS), Access Node (AN) or Access Point (AP) etc. depending on the technology and terminology used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. Hereafter, the terms "base station" and "eNB" will be used interchangeably, while the terms "terminal device" and "UE" will be used interchangeably.

For the DRX behavior in LAA networks, a straightforward idea is to follow that described for carrier aggregation (CA), i.e. only a single DRX thread is monitored on all cells. Yet considering the LAA scenario, where there would be licensed carriers on which the eNB has full control of the resource availability, and unlicensed carriers on which the resource availability is out of network's control, the existing DRX scheme encounters problems when applied to the LAA scenario directly. Because of the uncertainty of resource availability in unlicensed carriers due to LBT requirements, when a UE wakes up for a resource grant from the eNB, the eNB may fail to send the resource grant to the UE due to LBT failure. Since the UE does not detect activity in the active time period, for example limited by the onDurationTimer, it enters inactive state (i.e. goes back to sleep) again. The eNB has to wait for another DRX cycle to get a chance to wake up the UE for data transmission/reception although the eNB has data to send to the UE. In this case, an extra delay would be introduced. The delay increase cannot be ignored for delay-sensitive traffic.

On the other hand, the 802.11 WLAN power saving scheme also has some drawbacks if applied to the LAA scenario directly. In the WLAN system, since beacon transmission also follows the CSMA/CA scheme, there might be a delay before an AP succeeds in getting resources for beacon transmission, while the WLAN solution is to let the UE in active mode to wait until successful reception of the delayed beacon. After the successful reception, the timing on the UE side would be updated accordingly, so that the effect of the delay due to resource contention failure may be removed in the communication afterwards. The waiting for successful reception of the beacon may undesirably increase power consumption of the UE, thus deteriorating the expected power saving performance.

The power consumption of a UE comes from different components in its Tx/Rx chain. Depending on the UE implementation for the multi-carrier scenario, typically there will be carrier-specific components in the Tx/Rx chain, which means a carrier-specific DRX operation would help to further optimize the power consumption for each carrier respectively.

Therefore, another solution may be to decouple the DRX threads on licensed and unlicensed carriers, i.e., simply using separated DRX cycles (e.g. separated cycles/offset setting, separated timers) on the licensed and unlicensed carriers, but still following the traditional DRX behavior (e.g. timer definition/relationship), yet it may still not work well in some aspects:

For example, how for a UE to differentiate between the case when the eNB fails to get resources and the case when the eNB does not send a resource grant (e.g. the UL or DL grant) to the UE but has grabbed the resources. In a WLAN system, the beacon is open to all associated UEs and is thus decodable by each UE. Therefore, the UE can differentiate the above two cases by decoding beacon messages. However, in a 3GPP system, the Downlink Control Information (DCI) is used to deliver the resource grant to UEs. Usually each UE can only decode the grant information based on its own Cell-RadioNetworkTemporaryIdentifier (C-RNTI). In this case, there may be a possibility that when the UE becomes active, the DCI received by it may comprise a resource grant directed to other UE and thus cannot be decoded by that UE, so that the UE would fail to find the DCI dedicated to itself. Thus, the UE cannot differentiate the above two cases by decoding the DCI information.

Furthermore, when resources are not available on an unlicensed carrier, the communications may instead happen on a licensed carrier. In this case, if the UE still keeps active on the unlicensed carrier to wait for the successful transmission of DCI from the eNB, it would cause unnecessary power consumption. The DCI transmission may be expected by the UE during running of the onDurationTimer, InactivityTimer or DRX-RetransmissionTimer.

In order to address at least some of the above problems or drawbacks, embodiments of the present disclosure provide a novel DRX scheme applicable to the LAA scenario in consideration of uncertainty of resource availability on unlicensed carriers, which will be detailed hereafter with reference to FIGS. 3-12.

$1^{st}$ Solution: Decoupled DRX Threads

In the first solution, separated DRX threads may be used respectively for licensed carriers and unlicensed carriers. The "separated" used herein means that independent sets of parameters, e.g., timers (e.g. onDurationTimer, drx-InactivityTimer or drx-RetransmissionTimer), DRX cycles (e.g. short/long DRX cycles), DRX offset and etc. may be configured respectively for licensed carriers and unlicensed carriers. Different values may be set for the respective timers or cycles etc. on the licensed/unlicensed carriers, and further between different unlicensed carriers in order to handle different collision probability on different carriers.

Figure 3:
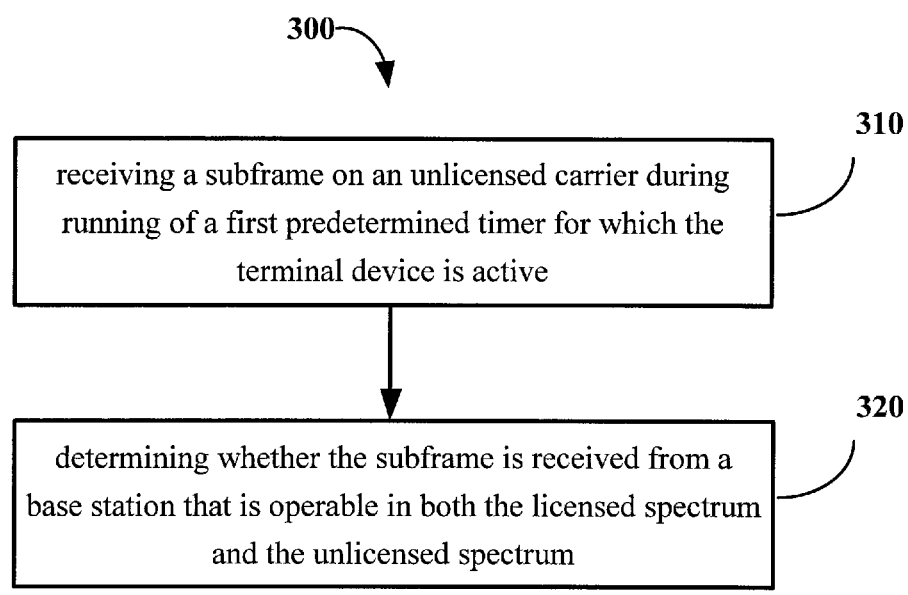
FIG. 3 illustrates a flowchart of a method for discontinuous reception at a terminal device according to an embodiment of the present disclosure.

FIG. 3 illustrates a flowchart of a method 300 for discontinuous reception at a terminal device according to an embodiment of the present disclosure. The terminal device is operable in both a licensed spectrum and an unlicensed spectrum, which means the terminal device can operate on both a licensed carrier of the licensed spectrum and an unlicensed carrier of the unlicensed spectrum.

Particularly, at block 310, the terminal device receives a subframe on an unlicensed carrier of the unlicensed spectrum during running of a first predetermined timer for which the terminal device is active. The first predetermined timer may be the onDurationTimer, drx-InactivityTimer or drx-RetransmissionTimer, for example.

Then at block 320, the terminal device determines whether the subframe is received from a base station. The base station is also operable in both the licensed spectrum and the unlicensed spectrum, which means this base station may serve the terminal device on both the licensed carrier of the licensed spectrum and the unlicensed carrier of the unlicensed spectrum.

In particular, the terminal device may perform measurement on a cellular system specific reference signal (RS). For example, the terminal device may detect a Signal to Interference and Noise Ratio (SINR), Reference Signal Received Power (RSRP), Reference Signal Received Quality (RSRQ). The cellular system specific RS (which will be simplified as "cellular RS" hereafter) may include, but not limiting to, Primary synchronization signal (PSS), Secondary synchronization signal (SSS) and Cell Specific Reference Signal defined in 3GPP. If the detected SINR, RSRP or RSRQ is bigger than a corresponding threshold, it may be determined that the subframe is received from the base station. The threshold may be predefined or configured by the base station. For simplicity, the subframe that is received from the base station may be referred to as a cellular subframe hereafter.

In a specific example, the terminal device may use a pre-known cellular RS to do a correlation operation with the received subframe. If the received subframe is a cellular subframe which contains an expected cellular RS, the correlation operation would produce a high Rx SINR, otherwise the Rx SINR of the received subframe is low. Therefore, by comparing the Rx SINR to a threshold, the terminal device may determine whether the received subframe contains the cellular RS, and thus whether it is a cellular subframe.

That the subframe is received from the base station means the base station has already obtained resources. Therefore, by determining whether the subframe is received from the base station, the terminal device may clearly differentiate between the case that the base station fails to get resources and the case that the base station did not send a resource grant while having obtained the resources.

The cellular system specific RS may not be contained in every cellular subframe. For example, for a single transmission opportunity, this RS may be contained in a first subframe, but it is still valid to judge that the subframes following the first one with the cellular RS is the cellular subframes as well.

In an embodiment, once it is determined that the received subframe is not a cellular subframe, i.e. not received from the base station, e.g. from a Wireless Fidelity (WiFi) network, the first predetermined timer may be extended. Then the method 300 proceeds to block 430 of FIG. 4 which illustrates a method flowchart following the operation of block 320 of FIG. 3 according to the embodiment that the first predetermined timer is extended.

At block 430, the first predetermined timer is extended in response to determining that the subframe is not received from the base station.

Then, the terminal device may keep receiving a subframe on the unlicensed carrier at block 440, and determining at block 450 whether the subframe is received from the base station during running of the extended first predetermined timer, i.e. before the extended first predetermined timer expires at block 470.

Optionally, once it is determined that a subframe is received from the base station at block 450, the extended first predetermined timer is stopped at block 460. Afterwards, all predetermined timers, e.g. onDurationTimer, drx-InactivityTimer or drx-RetransmissionTimer, may behave normally, e.g. following the existing DRX behaviour as defined in LTE specifications.

Otherwise, if no subframe is received from the base station and the extended first predetermined timer expires, then all predetermined timers, e.g. onDurationTimer, drx-InactivityTimer or drx-RetransmissionTimer, may behave normally, e.g. following the existing DRX behaviour as defined in LTE specifications. For example, the terminal device may also enter the inactive state afterwards.

Figure 5:
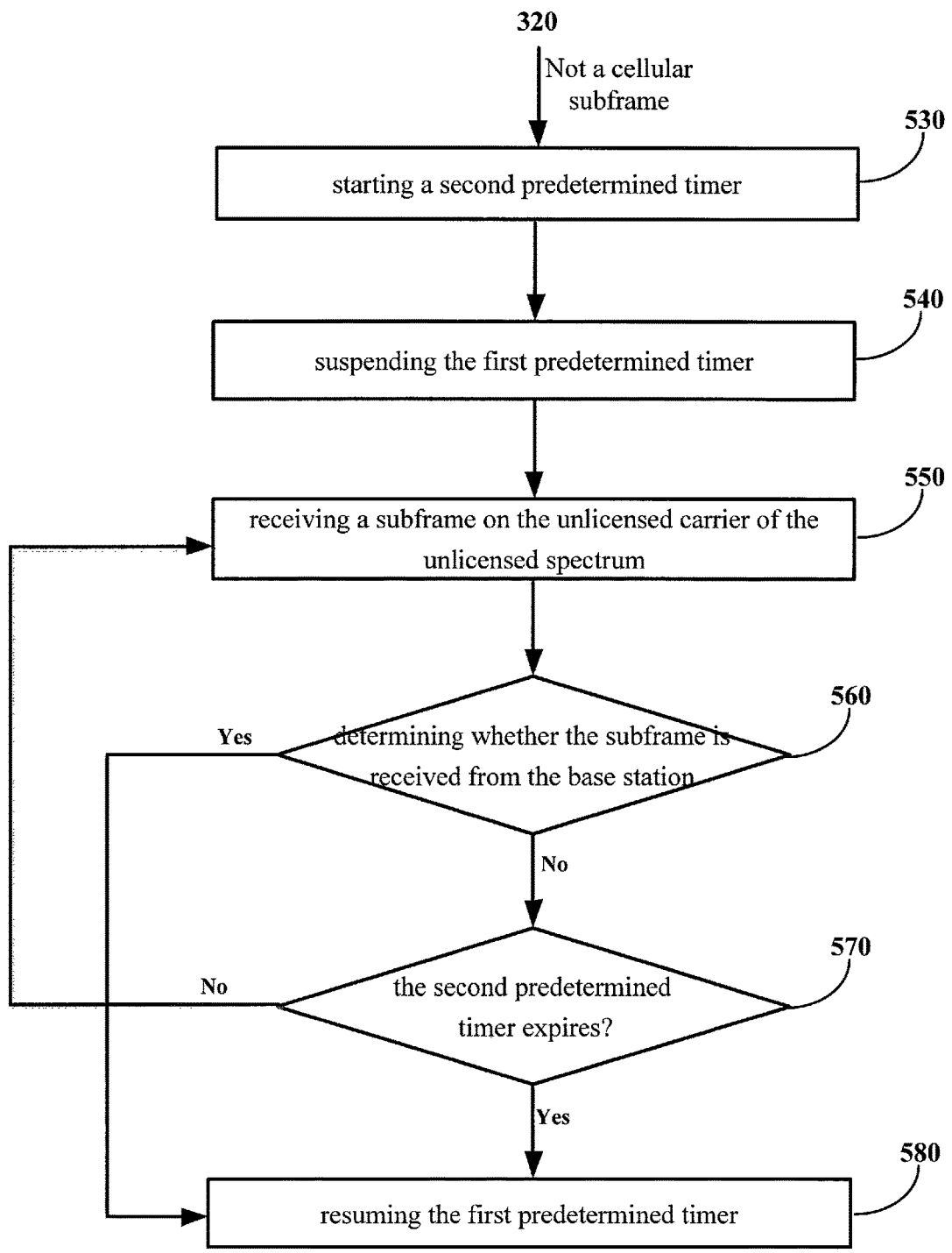
FIG. 5 illustrates a specific method flowchart following the operation the operation at block 320 of FIG. 3 according to another embodiment that the first predetermined timer is extended by adopting a second predetermined timer.

FIG. 5 illustrates a specific method flowchart following the operation the operation of block 320 of FIG. 3 according to another embodiment that the first predetermined timer is extended by adopting a second predetermined timer.

As illustrated in FIG. 5, in response to determining that the subframe is not received from the base station at block 320 of FIG. 3, a second predetermined timer may be started at block 530 and the first predetermined timer may be suspended at block 540. Although FIG. 5 shows the starting operation at block 530 before the suspending operation at block 540, it shall be appreciated that the two operations may also be performed in parallel or in a reverse order.

Then, during running of the second predetermined timer, the terminal device may keep receiving a subframe on the unlicensed carrier of the unlicensed spectrum at block 550 and determining whether the subframe is received from the base station at block 560.

Particularly, if it is determined at block 560 that the subframe received at block 550 is not from the base station, then whether the second predetermined timer expires is determined at block 570. If the second predetermined timer does not expire, then the flow goes back to block 530 in which the terminal device will receive a next subframe on the unlicensed carrier.

If the second predetermined timer expires at block 570, then the flow proceeds to block 580 in which the first predetermined timer may be resumed. Additionally, the second predetermined timer may be reset to an initially preconfigured value. Then, all predetermined timers will behave normally, e.g. following the DRX behaviour as defined in the 3GPP specifications.

If it is determined at block 560 that the subframe received at block 550 is from the base station, then the flow may directly proceed to block 580 in which the first predetermined timer may be resumed. Additionally, the second predetermined timer may be reset to the initially preconfigured value. Then, all predetermined timers will behave normally.

In another embodiment, if it is determined at block 570 that the second predetermined timer expires, then the first predetermined timer may be stopped directly. This embodiment may help the terminal device to enter the inactive state earlier, when it is detected that the collision possibility on the unlicensed carrier is high during the running of the second predetermined timer, so as to further reduce power consumption of the terminal device.

Figure 4:
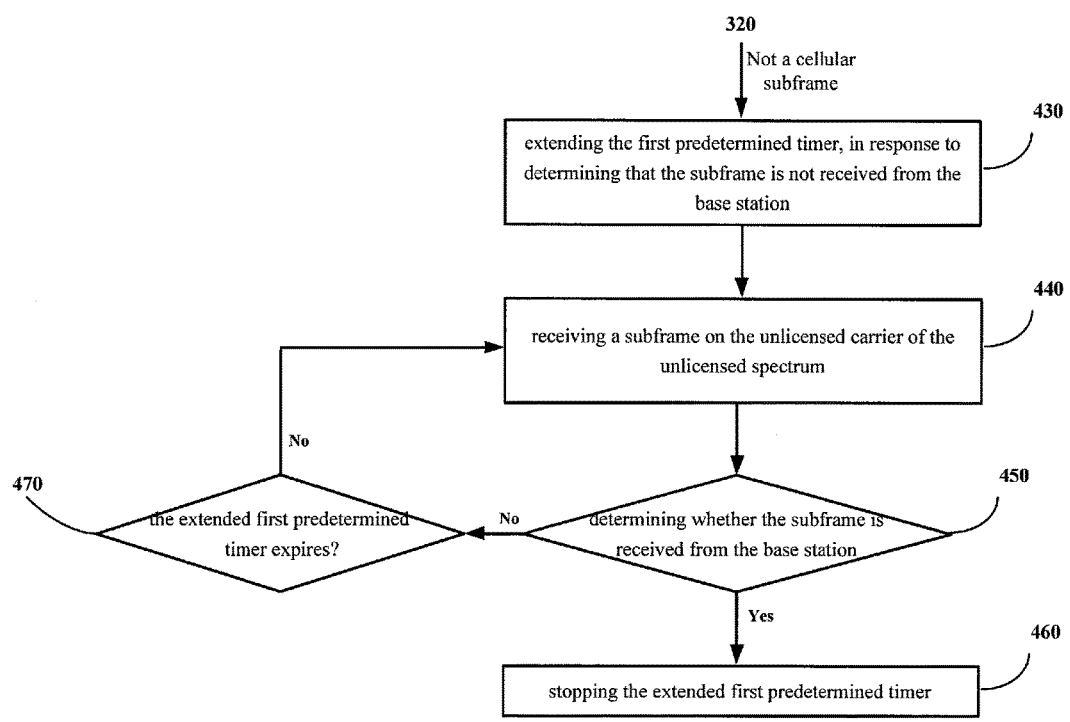
FIG. 4 illustrates a method flowchart following the operation at block 320 of FIG. 3 according to an embodiment that the first predetermined timer is extended.

According to the DRX solution as described with reference to FIG. 4 and FIG. 5, even though the predetermined active period is going to expire, the terminal device may still have more time to wait for successful transmission from the base station, while this waiting timer is not endless, and rather can be configured according to implementation requirements or the power condition of the terminal device, for example. Therefore, compared to the existing DRX scheme in LTE or the power saving scheme in 802.11, the DRX solution according to above embodiments of the present disclosure provides an option to trade-off between the waiting time and the power consumption.

Figure 6:
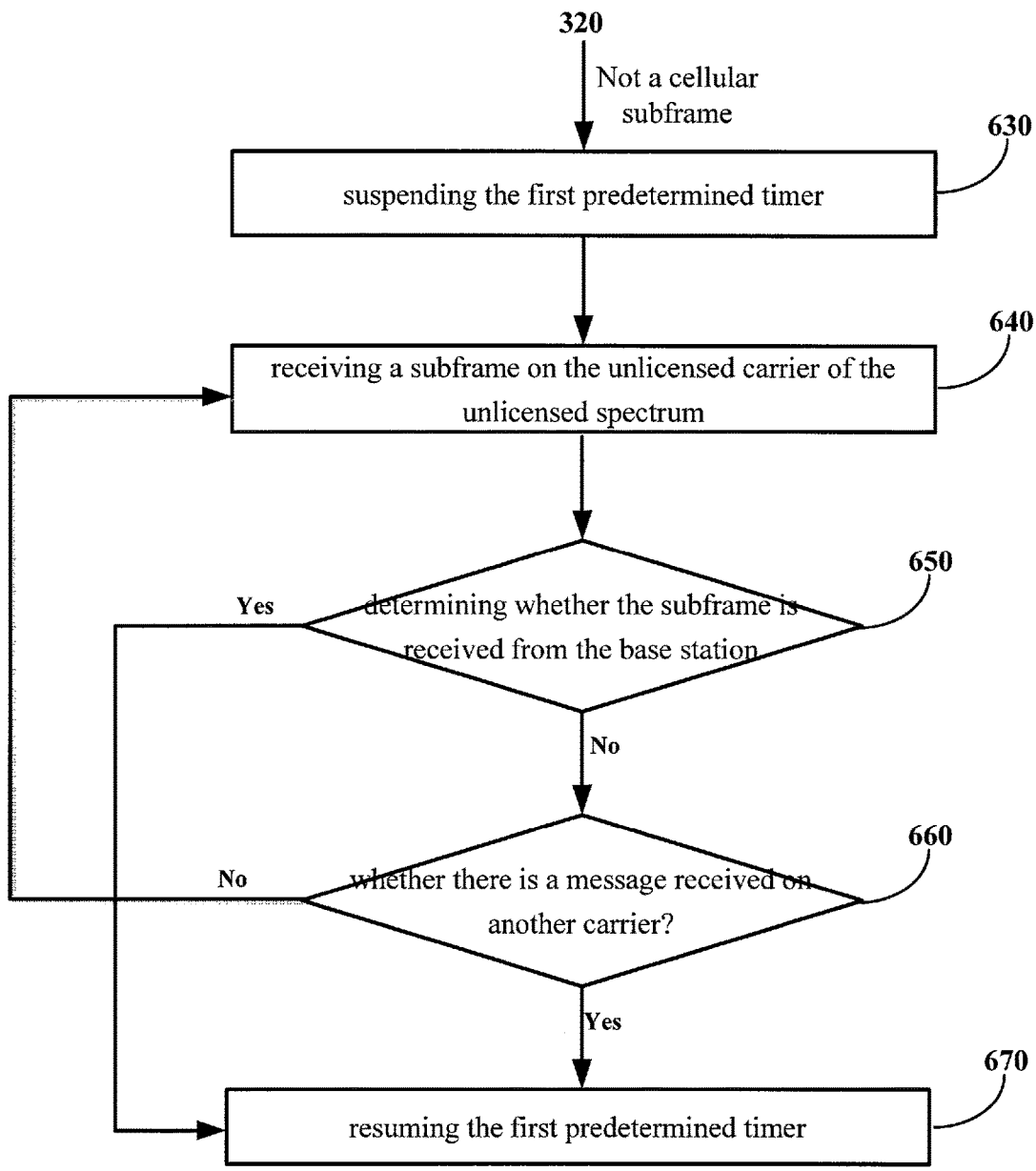
FIG. 6 illustrates another method flowchart following the operation at block 320 of FIG. 3 according to another embodiment of the present disclosure.

Now back to FIG. 3. If it is determined at block 320 that the received subframe is not a cellular subframe, i.e. not from the base station, the method 300 may enter block 630 of FIG. 6. FIG. 6 illustrates another method flowchart following the operation of block 320 of FIG. 3 according to another embodiment of the present disclosure.

At block 630, the first predetermined timer may be suspended in response to determining at block 320 of FIG. 3 that the subframe is not received from the base station, Then, during the suspending of the first predetermined timer, the terminal device keeps receiving a subframe on the unlicensed carrier of the unlicensed spectrum at block 640 and determining whether the subframe is received from the base station at block 650.

If it is determined that the subframe is received from the base station, then the flow proceeds to block 670, in which the suspended first predetermined timer may be resumed. Accordingly, all predetermined timers, e.g. onDurationTimer, drx-InactivityTimer, drx-RetransmissionTimer, will behave normally, e.g. following the existing DRX behavior as defined in the 3GPP specifications.

If no subframe is received from the base station, then the flow proceeds to block 660 to determine whether a message that may causes resuming of the first predetermined timer is received on another carrier from the base station. The message may be received on a licensed carrier or on another unlicensed carrier. The message may not possibly be received on the unlicensed carrier in discussion since no subframe being received from the base station means that the base station may not have obtained a resource on that unlicensed carrier for transmission.

The message may comprise any of the following: downlink control information containing a resource grant to a specific terminal device; downlink control information indicating end of an active period, e.g. limited by the first predetermined timer, on a specific unlicensed carrier; a media access control element indicating end of an active period, e.g. limited by the first predetermined timer, on a specific unlicensed carrier; or radio resource signaling for reconfiguring configurations of the discontinuous reception on the unlicensed carrier.

If no message is received at block 660 from the base station, then the flow goes back to block 640 to receive a next subframe; otherwise, the first predetermined timer may be resumed according to the message at block 670. Afterwards, all predetermined timers will behave normally. In another embodiment, the first determined timer may be stopped directly. Such an embodiment may help the terminal device to enter the inactive state earlier, when it is detected that the collision possibility on the unlicensed carrier is high during the waiting for the message, so as to further reduce power consumption of the terminal device.

Figure 7:
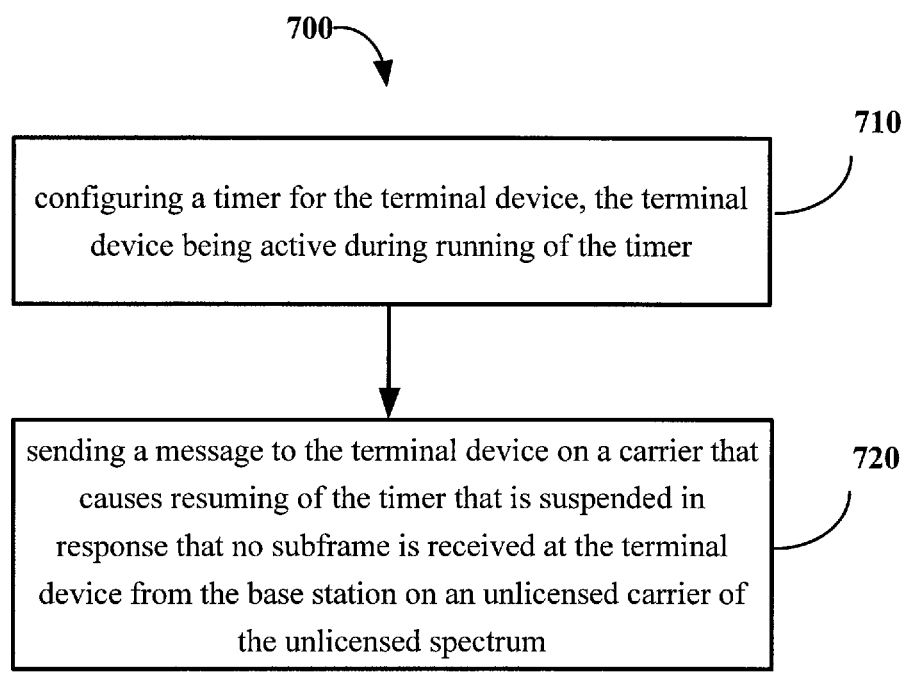
FIG. 7 illustrates a flowchart of a method for facilitating discontinuous reception of a terminal device according to an embodiment of the present disclosure.

FIG. 7 illustrates a flowchart of a method 700 for facilitating discontinuous reception of a terminal device according to an embodiment of the present disclosure. The method 700 is performed at a base station in correspondence with the method as described with reference to FIG. 6. The base station and the terminal device are operable in both a licensed spectrum and an unlicensed spectrum.

At block 710, a timer during which the terminal device is active is configured by the base station for the terminal device. For example, the timer may be the onDurationTimer, drx-InactivityTimer, or drx-RetransmissionTimer.

At block 720, a message is sent to the terminal device on a carrier that may cause resuming of the timer that is suspended in response that no subframe is received at the terminal device from the base station on an unlicensed carrier of the unlicensed spectrum. The carrier on which the message is sent may be a licensed carrier of the licensed spectrum or another unlicensed carrier of the unlicensed spectrum.

In another embodiment, the message may be designed to directly cause stop of the timer that is suspended in response that no subframe is received at the terminal device from the base station on an unlicensed carrier of the unlicensed spectrum. Such an embodiment may help the terminal device to enter the inactive state earlier, when it is detected that the collision possibility on the unlicensed carrier is high during the terminal device waiting for the message, so as to further reduce power consumption of the terminal device.

As an example, the message may be sent in a case that an expected transmission has already been done on a licensed carrier. Therefore, there is no need to keep the terminal device active on the unlicensed carrier for the expected transmission.

In various embodiments, the message may comprise any of the following: downlink control information containing a resource grant to a specific terminal device; downlink control information indicating end of an active period on a specific unlicensed carrier; a media access control element indicating end of an active period on a specific unlicensed carrier; or radio resource signaling for reconfiguring configurations of the discontinuous reception on the unlicensed carrier, as mentioned above.

By means of the methods according to the embodiments as illustrated in FIGS. 6 and 7, the base station can dynamically and actively control the time taken by the terminal device to wait for successful transmission from the base station on the unlicensed carrier, according to the overall scheduling situation on all schedulable carriers, so that the waiting time may be properly extended taking into account the power consumption of the terminal device.

Figure 8:
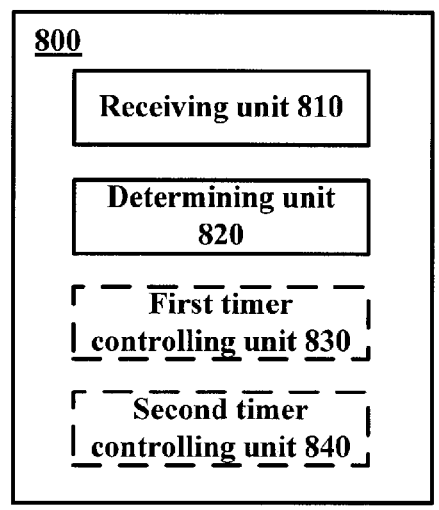
FIG. 8 illustrates a schematic block diagram of an apparatus for discontinuous reception according to an embodiment of the present disclosure.

FIG. 8 illustrates a schematic block diagram of an apparatus 800 for discontinuous reception according to an embodiment of the present disclosure. The terminal device is operable in both a licensed spectrum and an unlicensed spectrum. The apparatus 800 may be embodied as a terminal device, or a part thereof.

Particularly, the apparatus 800 comprises a receiving unit 810 and a determining unit 820. The receiving unit 810 is configured to receive a subframe on an unlicensed carrier of the unlicensed spectrum during running of a first predetermined timer for which the terminal device is active. The determining unit 820 is configured to determine whether the subframe is received from a base station that is also operable in both the licensed spectrum and the unlicensed spectrum.

In an embodiment, the apparatus 800 may further comprise a first timer controlling unit 830. The first timer controlling unit 830 may be configured to extend the first predetermined timer in response to determining by the determining unit 820 that the subframe is not received from the base station. In this embodiment, the receiving unit 810 may be further configured to keep receiving a subframe on the unlicensed carrier of the unlicensed spectrum during running of the extended predetermined timer The determining unit 820 may be further configured to determine whether the subframe is received from the base station during the running of the extended predetermined timer. The first timer controlling unit 830 may be further configured to stop the extended first predetermined timer in response that a subframe is received from the base station.

In a further embodiment, the first timer controlling unit 830 may be further configured to extend the first predetermined timer by starting a second predetermined timer and suspending the first predetermined timer in response to determining by the determining unit 820 that the subframe is not received from the base station, and resuming the first predetermined timer upon the second predetermined timer expires.

In another embodiment, the apparatus 800 may further comprise a second timer controlling unit 840 that is configured to suspend the first predetermined timer in response to determining by the determining unit 820 that the subframe is not received from the base station. In this embodiment, the receiving unit 810 may be further configured to receive a subframe on the unlicensed carrier of the unlicensed spectrum during the suspending of the first predetermined timer. The determining unit 820 may be further configured to determine whether the subframe is received from the base station during the suspending of the first predetermined timer. The second timer controlling unit 840 may be further configured to resume the first predetermined timer in response to reception of a message on another carrier that causes resuming of the first predetermined timer.

The above units 810-840 may be configured to implement the corresponding operations or steps as described with reference to FIG. 4-6 and thus will not be detailed herein for the sake of brevity.

Figure 9:
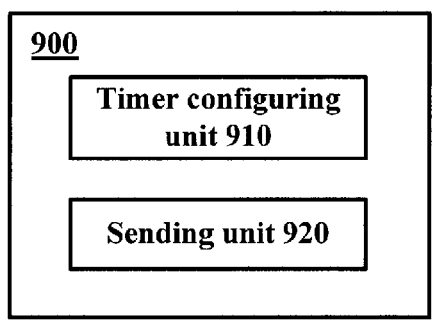
FIG. 9 illustrates a schematic block diagram of an apparatus for facilitating discontinuous reception of a terminal device according to an embodiment of the present disclosure.

FIG. 9 illustrates a schematic block diagram of an apparatus 900 for facilitating discontinuous reception of a terminal device according to an embodiment of the present disclosure. The apparatus 900 may be embodied as a base station or a part of the base station. The base station and the terminal device are operable in both a licensed spectrum and an unlicensed spectrum.

Particularly, the apparatus 900 comprises a timer configuring unit 910 and a sending unit 920. The timer configuring unit 910 is configured to configure a timer for the terminal device. The terminal device is active during running of the timer. The sending unit 920 is configured to send a message to the terminal device that causes resuming of the timer that is suspended in response that no subframe is received at the terminal device from the base station on an unlicensed carrier of the unlicensed spectrum. The message is sent on a carrier that may be a licensed carrier of the licensed spectrum or another unlicensed carrier of the unlicensed spectrum.

As discussed above in reference to FIG. 6, the message may comprises any of the following: downlink control information containing a resource grant to a specific terminal device; downlink control information indicating end of an active period on a specific unlicensed carrier; a media access control element indicating end of an active period on a specific unlicensed carrier; or radio resource signaling for reconfiguring configurations of the discontinuous reception on the unlicensed carrier.

The above units 910-920 may be configured to implement the corresponding operations or steps as described with reference to FIG. 6 and thus will not be detailed herein for the sake of brevity.

2$^{nd}$ Solution: Single DRX Thread

In the LAA scenario, a UE may not detect a PDCCH either because the eNB failed to grab a resource due to failure in competition of resources on unlicensed carriers or because the eNB did not schedule the UE at all, while the active period set for the UE by a predetermined timer, such as onDurationTimer, drx-InactivityTimer, drx-RetransmissionTimer, keeps decreasing when it is waiting for successful transmission of PDCCH from the eNB. In order at least to avoid the situation that the active period set for the UE is going to expire due to the eNB cannot grab a resource while no PDCCH has not been received, some other embodiments of the present disclosure provide a second solution using a single DRX thread. This solution is an implementation based solution for the scheduler, which will be described with reference to FIGS. 10 and 11. In this solution, the same value may be set for respective timers, DRX cycles or offset etc. for licensed and unlicensed carriers in order that different carriers may be activated in the roughly same timing to save power.

Figure 10:
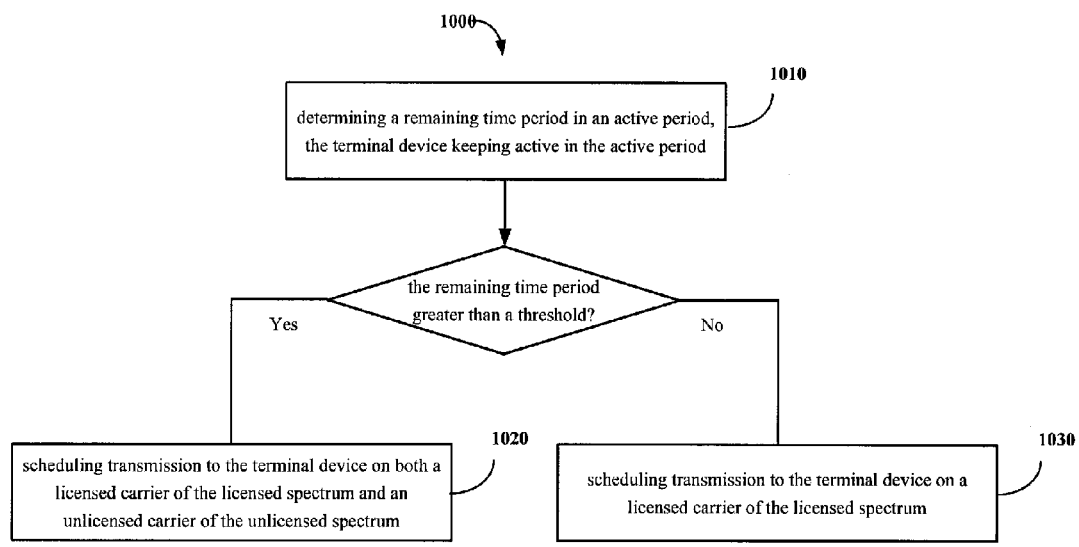
FIG. 10 illustrates a flowchart of another method for facilitating discontinuous reception of a terminal device according to an embodiment of the present disclosure.

FIG. 10 illustrates a flowchart of a method 1000 for facilitating discontinuous reception of a terminal device according to an embodiment of the present disclosure. The method 1000 is performed at a base station. The base station and the terminal device are operable in both a licensed spectrum and an unlicensed spectrum.

The method 1000 enters at block 1010 where a remaining time period in an active period is firstly determined. The active period may be limited by a predetermined timer, such as the onDurationTimer, drx-InactivityTimer, drx-RetransmissionTimer. The terminal device keeps active during the active period. The remaining time period herein refers to a time period that hasn't elapsed and still remains in the active period. Then at block 1020, transmission to the terminal device is scheduled on both a licensed carrier of the licensed spectrum and an unlicensed carrier of the unlicensed spectrum, if the remaining time period is greater than a predetermined threshold; otherwise, transmission to the terminal device is scheduled at block 1030 on the licensed carrier.

This method may keep using a single DRX thread in the LAA scenario, thereby maintaining a good compatibility with the existing networks. By means of this method, in the case that the active period set for the terminal device is going to expires, it is still ensured that the terminal device may have an opportunity to obtain the expected transmission on the licensed carrier.

Figure 11:
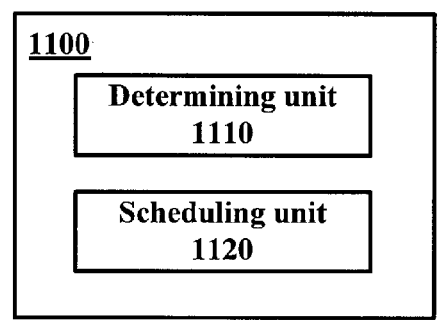
FIG. 11 illustrates a schematic block diagram of another apparatus for discontinuous reception of a terminal device according to an embodiment of the present disclosure.

FIG. 11 illustrates a schematic block diagram of an apparatus 1100 for discontinuous reception of a terminal device according to an embodiment of the present disclosure. The apparatus 1100 may be embodied as a base station or a part thereof The base station and the terminal device are operable in both a licensed spectrum and an unlicensed spectrum.

Particularly, the apparatus 1100 comprises a determining unit 1110 and a scheduling unit 1120. The determining unit 1110 is configured to determine a remaining time period in an active period. The terminal device keeps active in the active period. The scheduling unit 1120 is configured to schedule transmission to the terminal device on both a licensed carrier of the licensed spectrum and an unlicensed carrier of the unlicensed spectrum, if the remaining time period is greater than a predetermined threshold; otherwise to schedule transmission to the terminal device on the licensed carrier.

Figure 12:
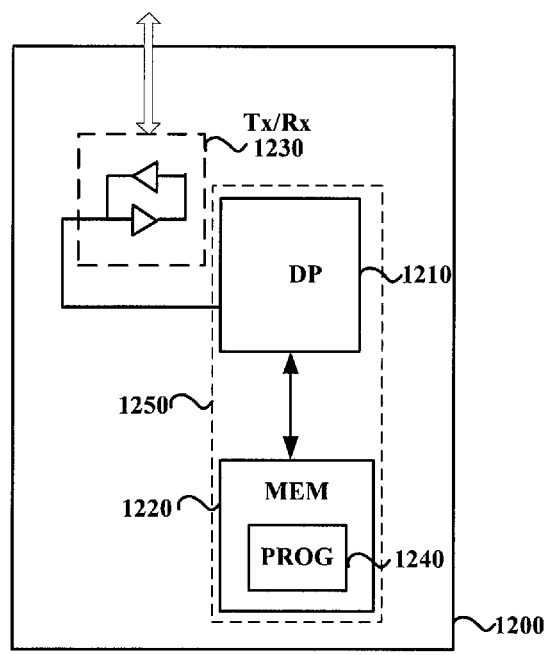
FIG. 12 illustrates a schematic block diagram of an apparatus according to embodiments of the present disclosure.

FIG. 12 illustrates a schematic block diagram of an apparatus 1200 according to embodiments of the present disclosure. The apparatus 1200 comprises at least one processor 1210, such as a data processor (DP) and at least one memory (MEM) 1220 coupled to the processor 1210. The apparatus 1200 may further comprise a transmitter TX and receiver RX 1230 coupled to the processor 1210 for establishing wire communications with other apparatuses. The MEM 1220 stores a program (PROG) 1240. A combination of the at least one processor 1210 and the at least one MEM 1220 may form processing means 1250 adapted to implement some embodiments of the present disclosure.

The apparatus 1200 may be embodied as a terminal device operable in both a licensed spectrum and an unlicensed spectrum or a part thereof. In this case, the PROG 1240 may include instructions that, when executed on the associated processor 1210, enable the apparatus 1200 to operate in accordance with the embodiments of the present disclosure, for example to perform the method as described with reference to FIGS. 3-6. Alternatively, the processing means 1250 may be adapted to implement some embodiments of the present disclosure as described with reference to FIGS. 3-6.

The apparatus 1200 may also be embodied as a base station operable in both the licensed spectrum and the unlicensed spectrum or a part thereof. In this case, the PROG 1240 may include instructions that, when executed on the associated processor 1210, enable the apparatus 1200 to operate in accordance with the embodiments of the present disclosure, for example to perform the method 700 as described with reference to FIG. 7 or the method 1000 as described with reference to FIG. 10. Alternatively, the processing means 1250 may be adapted to implement some embodiments of the present disclosure as described with reference to FIG. 7 or FIG. 10.

The MEM 1220 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1210 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for discontinuous reception at a terminal device operable in both a licensed spectrum and an unlicensed spectrum, comprising:
   receiving a subframe on an unlicensed carrier of the unlicensed spectrum during running of a first predetermined timer for which the terminal device is active;
   determining whether the subframe is received from a base station, wherein the base station is operable in both the licensed spectrum and the unlicensed spectrum;
   suspending the first predetermined timer in response to determining that the subframe is not received from the base station;
   keeping receiving a subframe on the unlicensed carrier of the unlicensed spectrum and determining whether the subframe is received from the base station during the suspending of the first predetermined timer; and
   resuming, the first predetermined timer in response to reception of a message on another carrier that causes resuming of the first predetermined timer.

2. The method according to claim 1, further comprising:
   extending the first predetermined timer in response to determining that the subframe is not received from the base station;
   during running of the extended first predetermined timer, keeping receiving a subframe on the unlicensed carrier of the unlicensed spectrum, and determining whether the subframe is received from the base station; and
   stopping the extended first predetermined timer in response that a subframe is received from the base station.

3. The method according to claim 2, wherein the first predetermined timer is extended by:
   starting a second predetermined timer and suspending the first predetermined timer in response to determining that the subframe is not received from the base station; and
   resuming the first predetermined timer upon the second predetermined timer expires.

4. The method according to claim 1, wherein
   said determining whether the subframe is received from the base station is based on a reference signal comprised in a received subframe.

5. The method according to claim 1, wherein the message comprises any of the following:
   downlink control information containing a resource grant to a specific terminal device; downlink control information indicating end of an active period on a specific unlicensed carrier; a media access control element indicating end of an active period on a specific unlicensed carrier; or radio resource signalling for reconfiguring configurations of the discontinuous reception on the unlicensed carrier.

6. A method at a base station for facilitating discontinuous reception of a terminal device, wherein the base station and the terminal device are operable in both a licensed spectrum and an unlicensed spectrum, the method comprising:
   configuring a timer for the terminal device, the terminal device being active during running of the timer; and
   sending a message to the terminal device on a carrier that causes resuming of the timer that is suspended in response that no subframe is received at the terminal device from the base station on an unlicensed carrier of the unlicensed spectrum, said carrier being a licensed carrier of the licensed spectrum or another unlicensed carrier of the unlicensed spectrum.

7. The method according to claim 5, wherein the message comprises any of the following:
downlink control information containing a resource grant to a specific terminal device; downlink control information indicating end of an active period on a specific unlicensed carrier; a media access control element indicating end of an active period on a specific unlicensed carrier; or radio resource signalling for reconfiguring configurations of the discontinuous reception on the unlicensed carrier.

8. A method at a base station for facilitating discontinuous reception of a terminal device, wherein the base station and the terminal device are operable in both a licensed spectrum and an unlicensed spectrum, the method comprising:
determining a remaining time period in an active period, the terminal device keeping active in the active period;
if the remaining time period is greater than a predetermined threshold, then scheduling transmission to the terminal device on both a licensed carrier of the licensed spectrum and an unlicensed carrier of the unlicensed spectrum; otherwise, scheduling transmission to the terminal device on the licensed carrier.

9. An apparatus for discontinuous reception at a terminal device operable in both a licensed spectrum and an unlicensed spectrum, comprising one or more processors configured to:
receive a subframe on an unlicensed carrier of the unlicensed spectrum during running of a first predetermined timer for which the terminal device is active;
determine whether the subframe is received from a base station, wherein the base station is operable in both the licensed spectrum and the unlicensed spectrum;
suspend the first predetermined timer in response to determining by the determining unit that the subframe is not received from the base station; wherein
receive a subframe on the unlicensed carrier of the unlicensed spectrum during the suspending of the first predetermined timer;
determine whether the subframe is received from the base station during the suspending of the first predetermined timer; and
resume the first predetermined timer in response to reception of a message on another carrier that causes resuming of the first predetermined timer.

10. The apparatus according to claim 9, wherein the one or more processors are further configured to:
extend the first predetermined timer in response to determining by the determining unit that the subframe is not received from the base station; wherein
keep receiving a subframe on the unlicensed carrier of the unlicensed spectrum during running of the extended predetermined timer;
determine whether the subframe is received from the base station during running of the extended predetermined timer; and
stop the extended first predetermined timer in response that a subframe is received from the base station.

11. The apparatus according to claim 10, wherein the one or more processors are further configured to:
start a second predetermined timer and suspend the first predetermined timer in response to determining by the determining unit that the subframe is not received from the base station, and to resume the first predetermined timer upon the second predetermined timer expires.

12. The apparatus according to claim 9, wherein the one or more processors are further
configured to determine whether the subframe is received from the base station based on a reference signal comprised in a received subframe.

13. The apparatus according to claim 9, wherein the message comprises any of the following:
downlink control information containing a resource grant to a specific terminal device; downlink control information indicating end of an active period on a specific unlicensed carrier; a media access control element indicating end of an active period on a specific unlicensed carrier; or radio resource signaling for reconfiguring configurations of the discontinuous reception on the unlicensed carrier.

14. An apparatus at a base station for facilitating discontinuous reception of a terminal device, wherein the base station and the terminal device are operable in both a licensed spectrum and an unlicensed spectrum, the apparatus comprising one or more processors configured to:
configure a timer for the terminal device, the terminal device being active during running of the timer; and
send a message to the terminal device on a carrier that causes resuming of the timer that is suspended in response that no subframe is received at the terminal device from the base station on an unlicensed carrier of the unlicensed spectrum, said carrier being a licensed carrier of the licensed spectrum or another unlicensed carrier of the unlicensed spectrum.

15. The apparatus according to claim 14, wherein the message comprises any of the following:
downlink control information containing a resource grant to a specific terminal device; downlink control information indicating end of an active period on a specific unlicensed carrier; a media access control element indicating end of an active period on a specific unlicensed carrier; or radio resource signalling for reconfiguring configurations of the discontinuous reception on the unlicensed carrier.

16. An apparatus at a base station for facilitating discontinuous reception of a terminal device, wherein the base station and the terminal device are operable in both a licensed spectrum and an unlicensed spectrum, the apparatus comprising one or more processors configured to:
determine a remaining time period in an active period, the terminal device keeping active in the active period;
schedule transmission to the terminal device on both a licensed carrier of the licensed spectrum and an unlicensed carrier of the unlicensed spectrum, if the remaining time period is greater than a predetermined threshold; otherwise to schedule transmission to the terminal device on the licensed carrier.

17. An apparatus for discontinuous reception at a terminal device operable in both a licensed spectrum and an unlicensed spectrum, the apparatus comprising a processor and a memory said memory containing instructions executable by said processor, whereby said apparatus is operative to perform the method of any of claim 1.

18. An apparatus for discontinuous reception at a terminal device operable in both a licensed spectrum and an unlicensed spectrum, the apparatus comprising processing means adapted to perform the method according to claim 1.

* * * * *